United States Patent
Wheaton et al.

(10) Patent No.: US 10,950,014 B2
(45) Date of Patent: Mar. 16, 2021

(54) METHOD AND APPARATUS FOR ADAPTIVE COMPRESSED SENSING (CS) TO CORRECT MOTION ARTIFACTS IN MAGNETIC RESONANCE IMAGING (MRI)

(71) Applicant: CANON MEDICAL SYSTEMS CORPORATION, Otawara (JP)

(72) Inventors: Andrew J. Wheaton, Vernon Hills, IL (US); Antonios Matakos, Vernon Hills, IL (US)

(73) Assignee: CANON MEDICAL SYSTEMS CORPORATION, Otawara (JP)

( * ) Notice: Subject to any disclaimer, the term of this patent is extended or adjusted under 35 U.S.C. 154(b) by 98 days.

(21) Appl. No.: 16/290,473

(22) Filed: Mar. 1, 2019

(65) Prior Publication Data

US 2020/0279413 A1 Sep. 3, 2020

(51) Int. Cl.
*G06T 11/00* (2006.01)
*G06T 7/00* (2017.01)

(52) U.S. Cl.
CPC .......... *G06T 11/008* (2013.01); *G06T 7/0002* (2013.01); *G06T 2207/20092* (2013.01);
(Continued)

(58) Field of Classification Search
CPC combination set(s) only.
See application file for complete search history.

(56) References Cited

U.S. PATENT DOCUMENTS 8,699,773 B2 * 4/2014 Akcakaya ............... G06T 5/002
382/131
8,761,478 B2 * 6/2014 Hsieh .................... G06T 11/006
382/131
(Continued)

FOREIGN PATENT DOCUMENTS

WO 2018/015298 A1 1/2018

OTHER PUBLICATIONS

Pham, et al. ; Improved Image Recovery From Compressed Data Contaminated With Impulsive Noise ; IEEE Transactions on Image Processing, vol. 21, Issue 1 ; Jan. 2102 ; 9 Pages.
Virtue, et al. ; The Empirical Effect of Gaussian Noise in Undersampled MRI Reconstruction ;Tomography, vol. 3, No. 4 ; Dec. 2017 ; 11 Pages.
Zaitsev, PhD., et al. ; Motion Artifacts in MRI: A Complex Problem With Many Partial Solutions ; Wiley Periodicals, Inc. ; Journal of Magnetic Resonance Imaging ; Dec. 22, 2014 ; 15 Pages.
(Continued)

*Primary Examiner* — Iman K Kholdebarin
(74) *Attorney, Agent, or Firm* — Oblon, McClelland, Maier & Neustadt, L.L.P.

(57) ABSTRACT

An apparatus and method are provided to correct motion artifacts in magnetic resonance imaging (MRI) data by finding and removing motion-corrupted encodes. The MRI data non-uniformly sample k-space using a series of shots, each including one or more encodes. The motion-corrupted encodes/shots are identified by omitting respective encodes/shots from the MRI data when reconstructing respective images using a compressed-sensing (CS) method. The image quality is improved for those reconstructed images in which the motion-corrupted encodes are omitted, whereas all other images include the motion-corrupted encodes and exhibit the motion artifact. Assuming a minority of encodes/shots are corrupted by motion, the images improved by omitting the motion-corrupted encodes can be identified as outliers. Once, the motion-corrupted encodes are identified and excluded from the final MRI dataset, a final, high-resolution image is reconstructed using the final MRI dataset.

20 Claims, 4 Drawing Sheets

(52) U.S. Cl.
CPC .............. *G06T 2207/30168* (2013.01); *G06T 2211/424* (2013.01)

(56) References Cited

U.S. PATENT DOCUMENTS

| | | | | |
|---|---|---|---|---|
| 9,208,588 | B2* | 12/2015 | Chen | ................ G06T 5/002 |
| 10,058,287 | B2* | 8/2018 | Meyer | ................ A61B 5/721 |
| 2011/0228999 | A1* | 9/2011 | Hsieh | ................ G06T 11/006 |
| | | | | 382/131 |
| 2013/0251225 | A1 | 9/2013 | Lie et al. | |
| 2015/0097563 | A1 | 4/2015 | Zenge | |
| 2015/0279065 | A1* | 10/2015 | Li | ................ G01R 33/5611 |
| | | | | 382/131 |
| 2017/0053402 | A1* | 2/2017 | Migukin | ................ G06T 7/0012 |
| 2017/0168129 | A1* | 6/2017 | Chen | ................ G06T 7/0012 |
| 2017/0309019 | A1* | 10/2017 | Knoll | ................ G06T 5/00 |
| 2018/0197317 | A1* | 7/2018 | Cheng | ................ G06N 3/08 |
| 2018/0204355 | A1* | 7/2018 | Mailhe | ................ G06T 11/006 |
| 2019/0108659 | A1* | 4/2019 | Li | ................ G06T 5/002 |
| 2019/0236816 | A1* | 8/2019 | Wang | ................ G06T 7/11 |
| 2020/0090382 | A1* | 3/2020 | Huang | ................ G06T 11/006 |
| 2020/0126213 | A1* | 4/2020 | Wheaton | ................ A61B 6/563 |
| 2020/0341100 | A1* | 10/2020 | Heukensfeldt Jansen | ................ G01R 33/4818 |

OTHER PUBLICATIONS

Wang, et al. ; Image Quality Assessment: From Error Visibility to Structural Similarity ; IEEE Transaction on Image Processing, vol. 13, No. 4 ; Apr. 2004 ; 14 Pages.

Miao, et al. ; Quantitative image quality evaluation of MR images using perceptual difference models ; Medical Physics, vol. 35 No. 6 ; Jun. 2008 ; 13 Pages.

Huang, et al. ; Data Convolution and Combination Operation (COCOA) for Motion Ghost Artifacts Reduction ; Magnetic Resonance in Medicine 64 ; pp. 157-166 ; 2010 ; 10 Pages.

Gdaniec, et al. ; Robust Abdominal Imaging with Incomplete Breath-Holds ; Magnetic Resonance in Medicine 71 ; pp. 1733-1742; 2014 ; 10 Pages.

Bydder, et al. ; Detection and Elimination of Motion Artifacts by Regeneration of k-Space ; Magnetic Resonance in Medicine 47 ; pp. 677-686 ; 2002 ; 10 Pages.

Atkinson, et al. ; Coil-Based Artifact Reduction ; Magnetic Resonance in Medicine 52 ; pp. 825-830 ; 2004 ; 6 Pages.

* cited by examiner

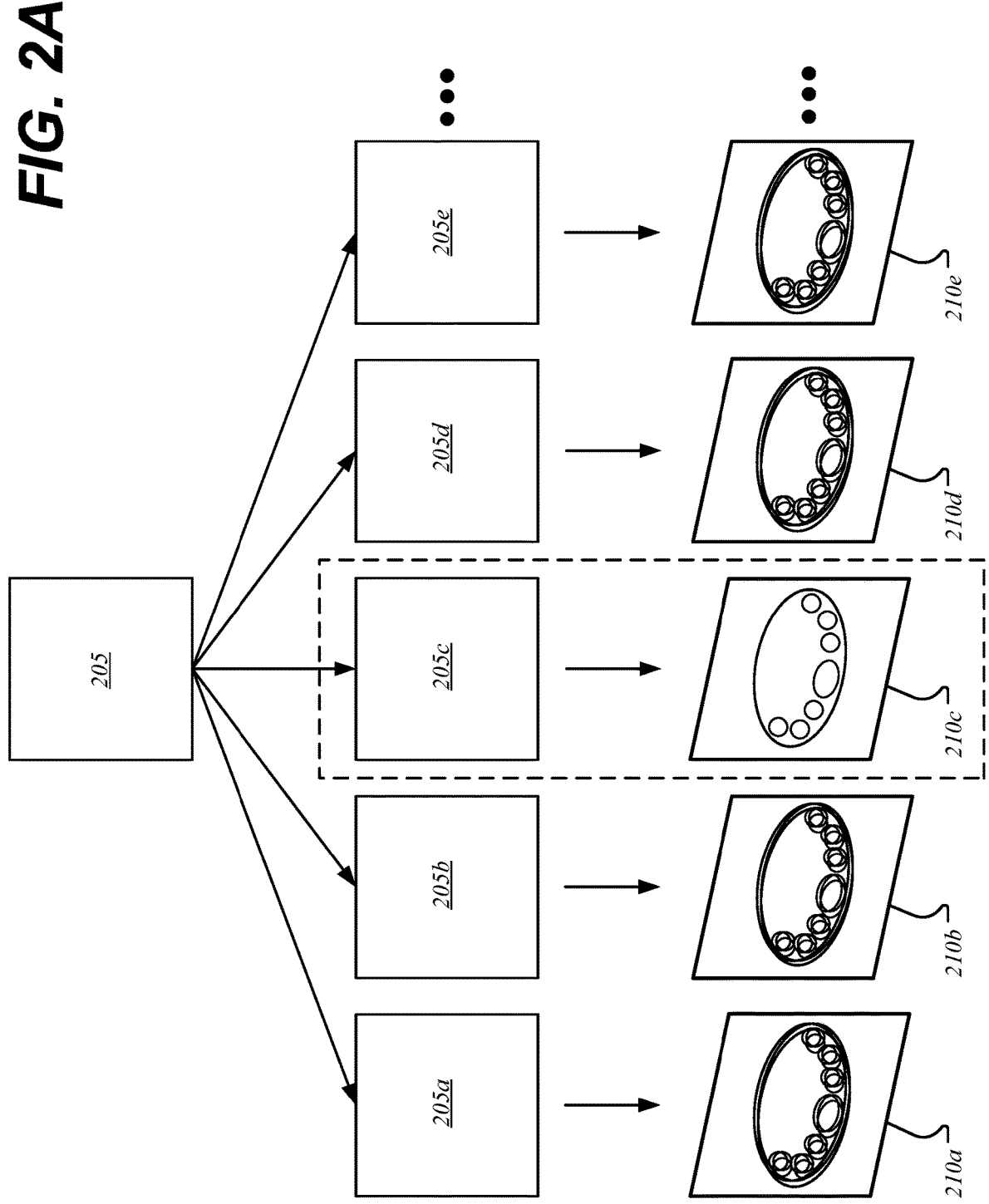

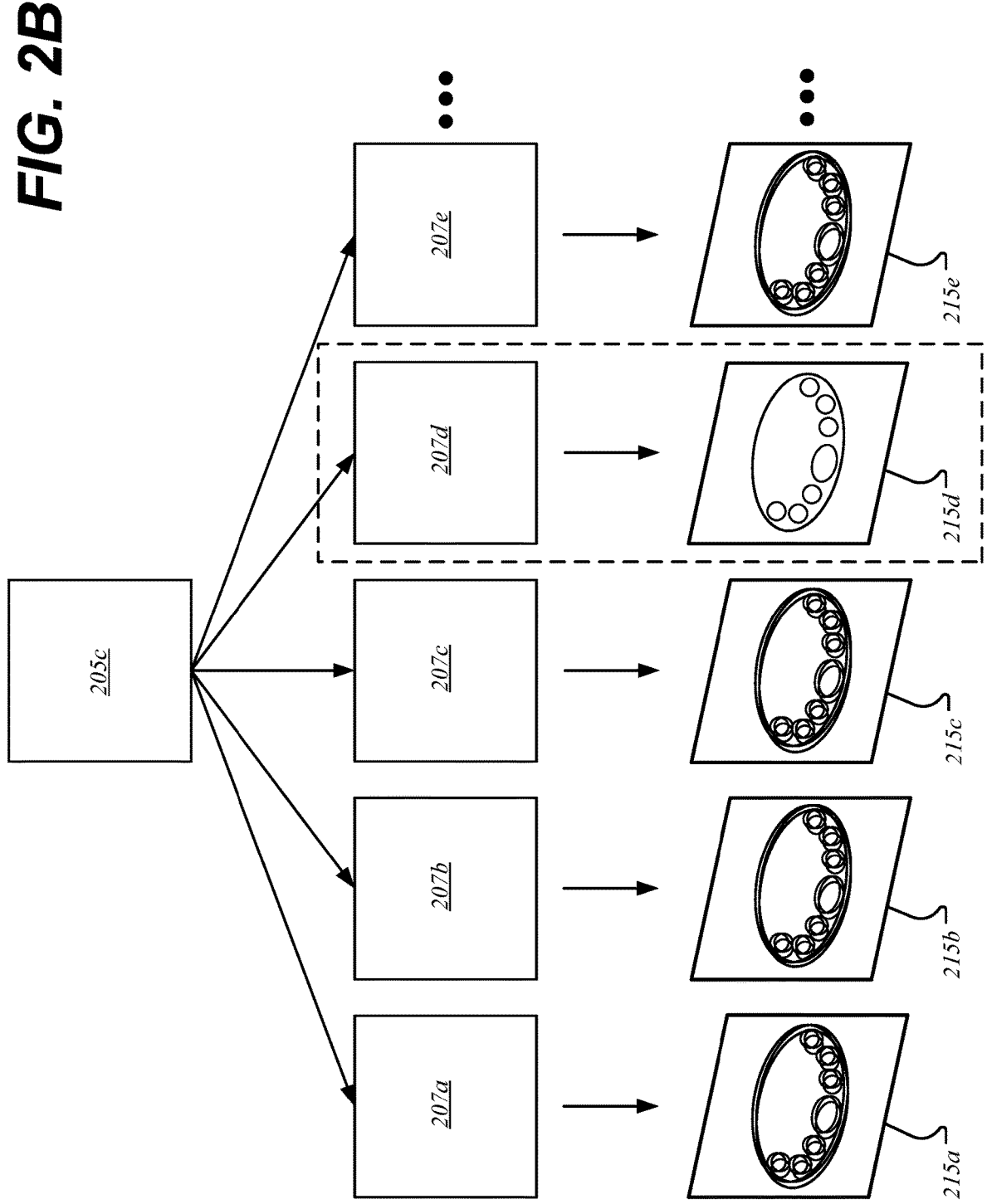

METHOD AND APPARATUS FOR ADAPTIVE COMPRESSED SENSING (CS) TO CORRECT MOTION ARTIFACTS IN MAGNETIC RESONANCE IMAGING (MRI)

FIELD

This disclosure relates to correcting motion artifacts in magnetic resonance imaging (MRI), and, more particularly, to using compressed sensing (CS) to determine encodes/measurements within the MRI data that are corrupted (e.g., correspond to the patient moving) and then generate the image using CS without the corrupted encodes/measurements.

BACKGROUND

The background description provided herein is for the purpose of generally presenting the context of the disclosure. Work of the presently named inventors, to the extent the work is described in this background section, as well as aspects of the description that cannot otherwise qualify as prior art at the time of filing, are neither expressly nor impliedly admitted as prior art against the present disclosure.

The image quality obtained during magnetic resonance imaging (MRI) is adversely affected by movements of a patient/subject, resulting in motion artifacts. This problem arises frequently due to the prolonged time required for common MRI sequences to collect sufficient data to form an image. This imaging time is commonly longer than the timescale of most types of physiological motion, including involuntary movements, cardiac and respiratory motion, gastrointestinal peristalsis, vessel pulsation, and blood and CSF flow. Examples of motion artifacts include blurring and ghosting in the image.

An entirely hardware-based approach to solving the motion artifact problem seems unlikely. Some technological improvements have reduced the significance of motion artifacts, while others have exacerbated their significance. On the one hand, incremental performance gains in hardware (e.g., higher performance gradients) have enabled faster imaging, as have breakthroughs such as parallel imaging. Faster imaging means that some scans can be performed in a shorter time, leading to a smaller chance of involuntarily subject motion. On the other hand, advances in hardware have improved the achievable resolution and signal-to-noise ratio (SNR), while also increasing the sensitivity to motion. Stronger gradients also mean greater phase accumulation for moving spins. Higher main field strengths and stronger gradients also mean that a typical MR scan is generally louder, which reduces the chance of infants sleeping through the procedure.

Accordingly, better algorithms are desired to reconstruct high-quality images from MRI data, even when some of the data has been corrupted by motion.

BRIEF DESCRIPTION OF THE DRAWINGS

A more complete understanding of this disclosure is provided by reference to the following detailed description when considered in connection with the accompanying drawings, wherein:

FIG. 2A illustrates a schematic block diagram of generating data subsets and identifying an image excluding motion-corrupted data, according to an exemplary implementation of the present disclosure;

FIG. 2B illustrates a schematic block diagram of continued data subset generation and identification of an image excluding motion-corrupted data, according to an exemplary implementation of the present disclosure.

DETAILED DESCRIPTION

Figure 1:
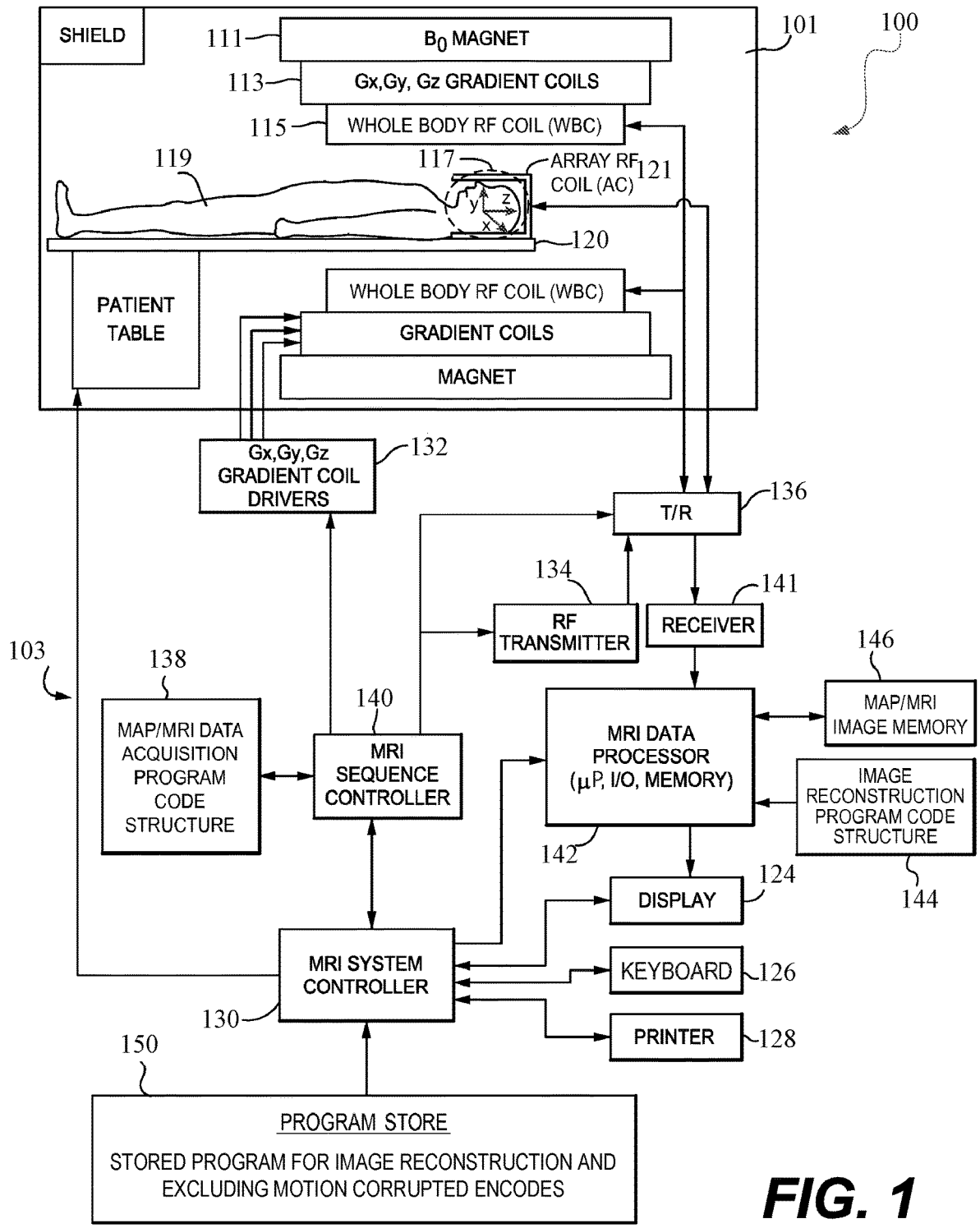
FIG. 1 illustrates a schematic block diagram of an MRI system, according to an exemplary implementation of the present disclosure.

Exemplary embodiments are illustrated in the referenced figures of the drawings. It is intended that the embodiments and figures disclosed herein are to be considered illustrative rather than restrictive. No limitation on the scope of the technology and of the claims that follow is to be imputed to the examples shown in the drawings and discussed herein.

The embodiments are mainly described in terms of particular processes and systems provided in particular implementations. However, the processes and systems will operate effectively in other implementations. Phrases such as 'an embodiment', 'one embodiment', and 'another embodiment' can refer to the same or different embodiments. The embodiments will be described with respect to methods and compositions having certain components. However, the methods and compositions can include more or less components than those shown, and variations in the arrangement and type of the components can be made without departing from the scope of the present disclosure.

The exemplary embodiments are described in the context of methods having certain steps. However, the methods and compositions operate effectively with additional steps and steps in different orders that are not inconsistent with the exemplary embodiments. Thus, the present disclosure is not intended to be limited to the embodiments shown, but is to be accorded the widest scope consistent with the principles and features described herein and as limited only by the appended claims.

Furthermore, where a range of values is provided, it is to be understood that each intervening value between an upper and lower limit of the range—and any other stated or intervening value in that stated range—is encompassed within the disclosure. Where the stated range includes upper and lower limits, ranges excluding either of those limits are also included. Unless expressly stated, the terms used herein are intended to have the plain and ordinary meaning as understood by those of ordinary skill in the art. Any definitions are intended to aid the reader in understanding the present disclosure, but are not intended to vary or otherwise limit the meaning of such terms unless specifically indicated.

Motion from a patient/object during an MRI scan can introduce artifacts in reconstructed images (blurring, ghosting, signal loss, etc.), leading to misdiagnosis or requiring multiple scans to mitigate said motion errors. While some motion can be prevented, involuntary movements from the patient, such as swallowing, breathing, pulsatile flow, etc. can still occur and degrade the quality of the results. This is especially common for pediatric and geriatric patients who dislike remaining in the instrument, cannot hold their breath for long periods of time, etc.

In MRI, the data acquisition does not occur directly in image space, but rather, in the frequency or Fourier space.

Motion artifacts can materialize in a scan due to myriad factors including the image structure, type of motion, MR pulse sequence settings, and k-space acquisition strategy. The center of k-space contains low spatial frequency information correlated to objects with large, low contrast features and smooth intensity variations, whereas the periphery of k-space contains high spatial frequency information correlated to edges, details, and sharp transitions. A majority of biological samples show very local spectral density in k-space centered around k=0. The kx and ky axes of k-space correspond to the horizontal (x-) and vertical (y-) axes of a two-dimensional (2D) image. The k-axes, however, represent spatial frequencies in the x- and y-directions rather than positions. For a three-dimensional (3D) image volume, the kz axis is also sampled, corresponding to a slice dimension of the image volume. Since the object in k-space is described by global planar waves, each point in k-space contains spatial frequency and phase information about every pixel in the final image. Conversely, each pixel in the image maps to every point in k-space. Simple reconstruction using an inverse FFT (iFFT) assumes the object has remained stationary during the time the k-space data were sampled. Therefore, errors from object motion have a pronounced effect on the final reconstructed image because a change in a single sample in k-space can affect the entire image. Since scan durations can take minutes in order to acquire the data necessary for image reconstruction, attempts have been made to accelerate the imaging speed as well as detect and correct for motion in images.

Simultaneously acquired parallel imaging (PI) data can be used to improve the MRI data of a coil array in k-space using a method known as Data Convolution and Combination Operation (COCOA). Data COCOA is a motion compensation technique using channel-by-channel k-space convolution. The coil sensitivity profiles offer additional information for the correction of artifacts in the k-space domain through estimating data points near the sampled trajectories. Instead of a reconstruction with partially acquired data, the convolution is used to produce an extra synthetic k-space dataset from the fully acquired k-space data. If motion occurs during the data acquisition, the synthetic and the acquired datasets will show differences, which can be used to locate the motion-corrupted data. However, the reconstruction time increases exponentially and can lead to difficulties in real-time and high-throughput imaging. Moreover, some k-space signals at unknown locations can be motion-corrupted, so the self-calibrated relative sensitivity maps cannot be artifact-free.

In the field of magnetic resonance imaging (MRI), Compressed Sensing (CS) is a relatively new and promising technique to accelerate the data acquisition process. Compressed sensing (also known as compressive sensing, compressive sampling, or sparse sampling) is a signal processing technique for efficiently acquiring and reconstructing a signal, by finding solutions to underdetermined linear systems. This is based on the principle that, through optimization, the sparsity of a signal can be exploited to recover it from far fewer samples than required by the Shannon-Nyquist sampling theorem. Conventionally, a fully sampled k-space—in accordance with the Nyquist sampling criterion—is required to reconstruct a magnetic resonance (MR) image without aliasing. However, CS enables reconstruction of an MR image from an under-sampled k-space, thereby violating the Nyquist criterion, by exploiting the fact that MR images are often sparse in some transform domain (e.g. the finite differences or wavelet transform). For example, acceleration factors up to 5-fold with only a minor decrease in image quality are possible. In clinical practice, this acceleration might help reduce costs, reduce patient burden, and/or increase scan resolution.

In CS, it is important that the image being reconstructed is consistent with the under-sampled k-space that has been acquired, while enforcing sparsity in the wavelet (or other) transform domain. This can be expressed as minimizing a cost/objective function having a data fidelity term and a regularizer that is weighted by a regularization parameter, i.e., the optimization problem can be expressed as $$\operatorname*{argmin}_{x}\{\|y - Ax\|_2^2 + \sum \lambda_j R_j(x)\},$$

where the $l_2$-norm is the data fidelity term, $R_j$ are the regularizers that promote desired properties or enforce constraints, and $\lambda_j$ are parameters that determine how strongly these regularizer constraints are enforced. The equation combines a data fidelity term ($l_2$-norm) with a sparsity promoting term ($l_1$-norm of the wavelet transform).

CS can be combined with parallel imaging (PI) to support reconstruction from undersampled data (using a predetermined sampling pattern) acquired up to a point in time when the scan is cancelled. Navigator-based detection can be used to detect the onset of motion, and then trigger termination of the scan. Thus, all data acquired during the scan is before the motion (i.e., when the patient is motionless), and data when the patient moves is rejected, such that only consistent data is used for reconstruction and limiting motion artifacts. It is also desirable for sample distributions from arbitrary temporal combinations from arbitrary temporal phases to have Poisson-disc-like properties. This method aims to provide Poisson-disc sample distributions amenable to joint CS PI reconstruction within a variable data collection window for the purpose of acquiring a single image in an incomplete breath-hold. In such a setting, said motion occurs after data collection at a time that is unknown a priori, and k-space is segmented in nested regions.

As mentioned previously, data can be removed from random locations without drastically affecting image quality (IQ), or artifacts and signal-to-noise ratio (SNR). CS IQ is only weakly related to number of encodes, given as acceleration factor R. For example, typically there are only insignificant differences in IQ when using R values of 2.0 and 2.2. Similarly, there are typically only insignificant differences in IQ when using R values of 3.0 and 3.3.

If the data is fully sampled, data from one coil is sufficient to reconstruct an image, but using data from multiple coils can make the image reconstruction more robust. A straightforward Fourier Transform would give an image weighted by the coil sensitivity and dividing this by the coil sensitivity can yield a more uniform image. In another example, increasing spatial and temporal resolution of the acquisition by using multiple receiver coils with different spatial sensitivities can provide complementary information about an object in order to correct image artifacts. This can enable the reconstruction of multiple images using data from different combinations of coils followed by comparison of said images to determine artifact presence based on varying intensities due to the differing coil sensitivities. The process can be repeated for each coil to give n images. In the absence of noise and artifacts, these n+1 images should be identical. For images with motion present, the artifacts will appear at the same spatial locations in each image, but with different intensities. In each image, the artifacts can originate from the same spatial location, but at the location of the presentation of the artifact, the intensities differ because the reconstruction for each image divides by the specific coil sensitivity which are different per coil. When artifact-containing images are compared, there will be a difference that is minimized when the artifact is minimized. However, reconstruction using data from a single coil can be insufficient and yield a poor quality image.

Referring now to the drawings, wherein like reference numerals designate identical or corresponding parts throughout the several views, FIG. 1 shows a non-limiting example of a magnetic resonance imaging (MRI) system 100. The MRI system 100 depicted in FIG. 1 includes a gantry 101 (shown in a schematic cross-section) and various related system components 103 interfaced therewith. At least the gantry 101 is typically located in a shielded room. The MRI system geometry depicted in FIG. 1 includes a substantially coaxial cylindrical arrangement of the static field $B_0$ magnet 111, a Gx, Gy, and Gz gradient coil set 113, and a large whole-body RF coil (WBC) assembly 115. Along a horizontal axis of this cylindrical array of elements is an imaging volume 117 shown as substantially encompassing the head of a patient 119 supported by a patient table 120.

One or more smaller array RF coils 121 can be more closely coupled to the patient's head (referred to herein, for example, as "scanned object" or "object") in imaging volume 117. As those in the art will appreciate, compared to the WBC (whole-body coil), relatively small coils and/or arrays, such as surface coils or the like, are often customized for particular body parts (e.g., arms, shoulders, elbows, wrists, knees, legs, chest, spine, etc.). Such smaller RF coils are referred to herein as array coils (AC) or phased-array coils (PAC). These can include at least one coil configured to transmit RF signals into the imaging volume, and a plurality of receiver coils configured to receive RF signals from an object, such as the patient's head, in the imaging volume.

The MRI system 100 includes a MRI system controller 130 that has input/output ports connected to a display 124, a keyboard 126, and a printer 128. As will be appreciated, the display 124 can be of the touch-screen variety so that it provides control inputs as well. A mouse or other I/O device(s) can also be provided.

The MRI system controller 130 interfaces with a MRI sequence controller 140, which, in turn, controls the Gx, Gy, and Gz gradient coil drivers 132, as well as the RF transmitter 134, and the transmit/receive switch 136 (if the same RF coil is used for both transmission and reception). The MRI sequence controller 140 includes suitable program code structure 138 for implementing MRI imaging (also known as nuclear magnetic resonance, or NMR, imaging) techniques including parallel imaging. MRI sequence controller 140 can be configured for MR imaging with or without parallel imaging. Moreover, the MRI sequence controller 140 can facilitate one or more preparation scan (pre-scan) sequences, and a scan sequence to obtain a main scan magnetic resonance (MR) image (referred to as a diagnostic image). MR data from pre-scans can be used, for example, to determine sensitivity maps for RF coils 115 and/or 121 (sometimes referred to as coil sensitivity maps or spatial sensitivity maps), and to determine unfolding maps for parallel imaging.

The MRI system components 103 include an RF receiver 141 providing input to data processor 142 so as to create processed image data, which is sent to display 124. The MRI data processor 142 is also configured to access previously generated MR data, images, and/or maps, such as, for example, coil sensitivity maps, parallel image unfolding maps, distortion maps and/or system configuration parameters 146, and MRI image reconstruction program code structures 144 and 150.

In one embodiment, the MRI data processor 142 includes processing circuitry. The processing circuitry can include devices such as an application-specific integrated circuit (ASIC), configurable logic devices (e.g., simple programmable logic devices (SPLDs), complex programmable logic devices (CPLDs), and field programmable gate arrays (FPGAs), and other circuit components that are arranged to perform the functions recited in the present disclosure.

The processor 142 executes one or more sequences of one or more instructions contained in the program code structures 144 and 150. Alternatively, the instructions can be read from another computer-readable medium, such as a hard disk or a removable media drive. One or more processors in a multi-processing arrangement can also be employed to execute the sequences of instructions contained in the program code structures 144 and 150. In alternative embodiments, hard-wired circuitry can be used in place of or in combination with software instructions. Thus, the disclosed embodiments are not limited to any specific combination of hardware circuitry and software.

Additionally, the term "computer-readable medium" as used herein refers to any non-transitory medium that participates in providing instructions to the processor 142 for execution. A computer readable medium can take many forms, including, but not limited to, non-volatile media or volatile media. Non-volatile media includes, for example, optical, magnetic disks, and magneto-optical disks, or a removable media drive. Volatile media includes dynamic memory.

Also illustrated in FIG. 1 is a generalized depiction of an MRI system program storage (memory) 150, where stored program code structures are stored in non-transitory computer-readable storage media accessible to the various data processing components of the MRI system 100. As those in the art will appreciate, the program store 150 can be segmented and directly connected, at least in part, to different ones of the system 103 processing computers having most immediate need for such stored program code structures in their normal operation (i.e., rather than being commonly stored and connected directly to the MRI system controller 130).

Additionally, the MRI system 100 as depicted in FIG. 1 can be utilized to practice exemplary embodiments described herein below. The system components can be divided into different logical collections of "boxes" and typically comprise numerous digital signal processors (DSP), microprocessors and special purpose processing circuits (e.g., for fast A/D conversions, fast Fourier transforming, array processing, etc.). Each of those processors is typically a clocked "state machine" wherein the physical data processing circuits progress from one physical state to another upon the occurrence of each clock cycle (or predetermined number of clock cycles).

Furthermore, not only does the physical state of the processing circuits (e.g., CPUs, registers, buffers, arithmetic units, etc.) progressively change from one clock cycle to another during the course of operation, the physical state of associated data storage media (e.g., bit storage sites in magnetic storage media) is transformed from one state to another during operation of such a system. For example, at the conclusion of an image reconstruction process and/or sometimes an image reconstruction map (e.g., coil sensitivity map, unfolding map, ghosting map, a distortion map etc.) generation process, an array of computer-readable accessible data value storage sites in physical storage media will be transformed from some prior state (e.g., all uniform "zero" values or all "one" values) to a new state wherein the physical states at the physical sites of such an array vary between minimum and maximum values to represent real world physical events and conditions (e.g., the internal physical structures of a patient over an imaging volume space). As those in the art will appreciate, such arrays of stored data values represent and also constitute a physical structure, as does a particular structure of computer control program codes that, when sequentially loaded into instruction registers and executed by one or more CPUs of the MRI system 100, causes a particular sequence of operational states to occur and be transitioned through within the MRI system 100.

MRI images are formed by acquiring NMR (nuclear magnetic resonance) RF response signals (e.g. echo data) spatially encoded for respectively corresponding points in k-space. The RF response values are typically generated by "traversing" k-space in two or three dimensions according to a configured MRI pulse sequence. The acquisition of data in the frequency-encoded spatially-encoding direction (e.g., along the x-axis) is typically rapid and on the order of several milliseconds. However, along the phase-encoded axis (e.g., y-axis), a different value of the applied phase-encoding gradient is used to sample each point. Therefore, typically, the acquisition time for an MRI image is largely determined by the number of phase-encoding steps.

As mentioned previously, CS is a signal processing technique for efficiently acquiring and reconstructing a signal, by finding solutions to underdetermined linear systems. This is based on the principle that, through optimization, the sparsity of a signal can be exploited to recover it from far fewer samples than required by the Shannon-Nyquist sampling theorem. However, patient/object motion can introduce artifacts. If the corrupted encodes are known, then CS can be used to reconstruct an image based on a reduced set of the MRI data in which the corrupted encodes are omitted, thereby allowing the reconstruction of an image free from motion artifacts. The methods described herein enable the identification of the corrupted encodes (i.e., the encodes effected by motion) and reconstruction of an image without using the corrupted encodes.

MRI data can be acquired using series of encodes (e.g., RF pulse sequences of excitation and refocusing pulses together with turning on and off respective magnetic fields/gradients) to sample points within the spatial frequency domain (e.g., k space). An MRI scan can include multiple shots, each of which can includes one or more encodes. Further, each encode can correspond to a respective pulse sequence to interrogate/sample one or more points in k space.

FIG. 2A illustrates a technique for identifying and removing motion-induced artifacts in an MR image, according to an exemplary implementation of the present disclosure. In one implementation, a dataset 205 for patient 119 can be obtained by the MRI system 100. For example, the dataset 205 can include time-dependent frequency signals, or frequency and phase data in k-space. A Fourier transform, for example a 2D Fourier transform, of this k-space can be computed to produce a gray-scale image. A length of time required for obtaining the dataset 205 can be determined by a predetermined number of shots programmed by a user to sample discrete points in k space. The predetermined number of shots can be determined by a desired level of resolution.

To generate the image, for example when the scan data is CS data, the one or more MRI system 100 can perform a reconstruction process on the scan data. Examples of reconstruction processes include GRAPPA, SENSE, ARC, SPIRiT, and LORAKS. If the scan data is CS data, the reconstruction process can be a non-linear process that enforces both the sparsity of the image representation within a given domain (e.g., spatial, time, wavelet) and the consistency of the reconstruction with the acquired scan data.

In one implementation, patient 119 might move during the course of the scan. For example, the patient 119 might move during the acquisition of one shot out of a total of 100 shots within scan, but which one of the 100 shots the motion occurred in is unknown. Thus, reconstruction of an image including all 100 shots will include the shot during which motion occurred and yield a motion artifact. If, however, it could be discovered during which shot the motion occurred, this shot could be excluded from the dataset to generate a reduced dataset that is motion free. An artifact-free image could be reconstructed from the reduced dataset using CS. Although the shot including the motion is unknown, this motion-corrupted shot can be determined via a process of reconstructing MRI images for respective subsets of the data 205 to find the image that is not affected by a motion artifact. That is, all of the images that include the motion artifact will be similar because of the motion artifact, whereas the one image without the motion artifact will be an outlier.

Accordingly, subsets 205a, 205b, 205c, 205d, and 205e are generated by omitting a different shot from the total data 205. For example, shot 1 can be omitted from the total data to generate subset 205a. Similarly, shots 2, 3, 4, and 5 can be respectively omitted from the total data to generate subsets 205b, 205c, 205d, and 205e (i.e., subset 205b includes all shots of the data 205 except shot 2, subset 205c includes all shots of the data 205 except shot 3, and so forth until each shot is omitted from one of the subsets). Using these subsets, respective images 210a, 210b, 210c, 210d, and 210e can be reconstructed using CS. FIG. 2A illustrates the case that shot 3 is the shot that is least corrupted by motion, and, therefore, compared to the other sub-set images 210c is an outlier. The similarity between the images can be calculated using a metric (e.g., a figure of merit) which represents as a measure of the similarity of each sub-set image to all other of the sub-set images. Then, the outlier can be selected as being the sub-set image exhibiting the least amount of motion artifact. Examples of image-comparison metrics include, e.g., an image quality assessment metric such as a Structural Similarity Index (SSI), a perceptual difference model (PDM), a root-mean-squared (RMS) comparison, and a pair-wise Euclidean distance measure of the differences between sub-set images, or any other p-norm based measure of difference among images.

Once an outlier subset image (e.g. subset image 210c) is determined, then the corresponding subset (e.g. subset 205c) can be used as the total dataset for a next iteration, as shown in FIG. 2B. That is, subsets 207a, 207b, 207c, 207d, 207e, etc. are generated from the selected subset 205c from the previous iteration by omitting respective shots from the subset 205c (e.g., subset 207a omits shot #1 from subset 205c, subset 207b omits shot #2 from subset 205c, and so forth). Then respective subset images 215a, 215b, 215c, 215d, 215e, etc. are generated from the corresponding subsets. As described above, the subset images 215a, 215b, 215c, 215d, and 215e can be compared to determine which of the images exhibits the least motion artifact (e.g., the image that is the greatest outlier or that has the best image quality according to a given image comparison metric). In FIG. 2B, the optimal image (i.e., exhibiting the least motion artifact) is determined to be image 215d, and, therefore, subset 207d is selected as the best subset. If the subset 207d is determined to be sufficiently expunged of motion-corrupted shots, then subset 207d can be used to reconstruct a final MRI image. Otherwise, the process for omitting motion-corrupted shots from the MRI data 205 can be repeated for several additional iterations, until the motion-corrupted shots are sufficiently expunged, and a final MRI image can be reconstructed.

This process can be performed for a predetermined number of iterations to remove a predetermined number of shots. Alternatively, the iterative process of removing shots can be performed until the image achieves a desired amount of improvement or a predefined image quality. In certain implementations, the number of iterations can be controlled manually (e.g., based on user inputs/feedback), or the iterations stop once the amount of improvement/change decreases below a certain threshold, signaling that the image has converged.

In certain implementations, the final-image reconstruction method used for the final MRI image can be different than the initial-image reconstruction method used for images 210a-210e and 215a-215e. For example, a fast, approximate reconstruction method would be useful for the repetitive process of reconstructing images 210a-210e and 215a-215e because these images do not require the highest image quality. That is, an image quality and resolution sufficient to differentiate between images that do and do not exhibit motion artifacts is sufficient for reconstructing images 210a-210e and 215a-215e. In contrast, the final image is reconstructed only once. Thus, a greater number of computations and longer computation time can be justified in order to achieve a better image quality for the final image. For example, if an iterative CS reconstruction method is used for both initial and final image reconstruction, then the final reconstruction method can use a greater number of iterations and/or higher resolution for the reconstructed image than is used for the reconstructed images 210a-210e and 215a-215e.

The description above is for a non-limiting example in which a greedy algorithm is used for determining which shots to omit. However, this is just one non-limiting example and, without departing from the spirit of the method described herein, other algorithms can be used to for determine which shots to omits, as would be understood by a person of ordinary skill in the art. The method of determining which shots to eliminate can be performed by eliminating multiple shots at each of the iterations. For example, a movement by a patient can occur during multiple shots. Thus, it would be intuitive to remove multiple consecutive shots, rather than one shot at a time. In certain implementations, the algorithm for determining which shots to eliminate can be a Dijkstra's algorithm or an A*search algorithm. In certain implementations, the shots eliminated during a given iteration can be more than one and the shots do not need to be adjacent in time. In certain implementations, the omitted data in the subsets can be less than an entire shot (e.g., if there are k encodes in a shot, then the omitted data can be for n encodes, wherein k>n).

Returning to FIG. 2A, a non-limiting example according to one implementation is now provided. A first shot may be removed from dataset 205 to yield a first subset 205a including 99 shots. Reconstruction of the first subset 205a using a first CS method may yield a first subset image 210a (herein referred to as first image 210a). For example, the first subset 205a may be frequency and phase data in k-space and the first CS method sparsely samples the first subset 205a in order to reduce reconstruction time. However, the first shot may not be the shot during which motion occurred and resulting first image 210a may still include motion artifacts.

A second shot may be removed from dataset 205 to yield a second subset 205b including 99 shots (including the first shot). Reconstruction of the second subset 205b using the first CS method may yield a second subset image 210b (herein referred to as second image 210b). However, the second shot may also not be the shot during which motion occurred and resulting second image 210b may also include motion artifacts.

A third shot may be removed from dataset 205 to yield a third subset 205c including 99 shots (including the first and second shot). Reconstruction of the third subset 205c using the first CS method may yield a third subset image 210c (herein referred to as third image 210c). The third shot may be the shot during which motion occurred and resulting third image 210c does not include motion artifacts.

Similar to the first and second subsets 205a, 205b, a fourth shot and a fifth shot may be removed from dataset 205 to yield a fourth subset 205d and a fifth subset 205e each including 99 shots (including the former shots). Reconstruction of the fourth subset 205d using the first CS method may yield a fourth subset image 210d (herein referred to as fourth image 210d) and reconstruction of the fifth subset 205e using the first CS method may yield a fifth subset image 210e (herein referred to as fifth image 210e). However, the fourth and fifth shots may also not be the shots during which motion occurred and resulting fourth and fifth images 210d, 210e may also include motion artifacts.

Thus, the motion-corrupted shot can be deduced based on which of the reconstructed images 210a-210e minimizes the motion artifact (e.g., exhibits the largest difference from all of the other images exhibiting the motion artifact).

In one implementation, a first comparison of the first image 210a to the second image 210b can be executed by the MRI system 100, for example by the processor 142. The first comparison of the first image 210a to the second image 210b can determine that the first image 210a is similar to the second image 210b. Assuming that only one shot of data includes motion, a first and second confidence rating can be assigned to the first image 210a and second image 210b, respectively. For example, the confidence ratings can describe both as likely to include the motion-corrupted shot.

A second comparison can be performed between the first image 210a and the third image 210c and the MRI system 100 can determine that the first image 210a is not similar to the third image 210c. A third confidence rating can be assigned to the third image 210c and the first and second confidence ratings can be updated based on the second comparison. For example, the third confidence rating can describe the third image 210c as likely to exclude the motion-corrupted shot, and the first and second confidence ratings can be updated to describe the respective images 210a, 210b as more likely (as compared to before the second comparison) to include the motion-corrupted shot.

A third comparison can be performed between the first image 210a and the fourth image 210d and the MRI system 100 can determine that the first image 210a and fourth image 210d are similar. A fourth confidence rating can be assigned to the fourth image 210d and the first, second, and third confidence ratings can be updated based on the third comparison. For example, the fourth confidence rating can describe the fourth image 210d as likely to include the motion-corrupted shot, the third confidence rating can be updated to describe the third image 210c as more likely to exclude the motion-corrupted shot (as compared to before the second comparison), and the first and second confidence ratings can be updated to describe the respective images 210a, 210b as more likely (as compared to before the first and second comparisons) to include the motion-corrupted shot.

This comparison method can be performed for all reconstructed images based on subsets of dataset 205 with a different single shot removed from each. For example, dataset 205 can include 100 shots and thus can produce 99 subsets, from which 98 comparisons of 99 reconstructed images can be performed. More generally, dataset 205 can include N shots and thus can produce N−1 subsets, from which N−2 comparisons can be performed. After completion, the reconstructed image with the confidence rating describing said image as most likely to have the motion-corrupted shot removed can be selected as an outlier. The subset used to reconstruct said outlier can be selected for reconstructing an updated image with less motion artifacts using a second CS method. For example, the third image 210c can be selected as the outlier with the motion-corrupted shot removed and third subset 205c can be used to reconstruct the updated (high resolution) image using the second CS method. In one implementation, the first CS method is the same as the second CS method but programmed to reconstruct faster. In one implementation, the first CS method is different from the second CS method and faster than the second CS method.

In one implementation, after all images are compared to the first image 210a, further comparisons can be performed with another selected image, for example the second image 210b. A comparison between the second image 210b and the first image 210a can not be necessary, or can be performed as a redundancy check. An i-th comparison can be performed between the second image 210b and the third image 210c and the MRI system 100 can determine that the second image 210b and third image 210c are not similar, wherein the second and third confidence ratings for the respective images 210b, 210c are updated as previously described (i.e. second confidence rating more likely to include motion-corrupted shot and the third confidence rating more likely to exclude motion-corrupted shot). The comparison method can continue for the N−1 reconstructed images that have been produced from the N−1 subsets.

In one embodiment, sets of images can be compared to other sets of images, wherein a set of images can include at least one image. For example, a first set of images can include the first image 210a and the second image 210b and a second set of images can include the fourth image 210d and the fifth image 210e. For example, the first set of images can include just the first image 210a and the second set of images can include the second image 210b, the fourth image 210d, and the fifth image 210e. It can be appreciated that any number of comparisons, whether unique or redundant, can be performed between sets of images including any number of images. For example, the number of unique comparisons can be determined by the combinatorial function $$C(N, k) = \frac{N!}{(N-k)!\,k!}$$

where N is the number of subsets and k is the number of images per set of images.

Returning now to FIG. 2B, a non-limiting example according to one implementation is provided. FIG. 2B illustrates a technique for continued identifying and removing of motion-induced artifacts in an MR image, according to an exemplary implementation of the present disclosure. In one implementation, after the third subset 205c is selected as the outlier with the motion-corrupted shot removed, an additional one or more shots can be removed from the third subset 205c to generate refined first, second, third, fourth, and fifth subsets 207a-207e prior to reconstructing the updated (high resolution) image. The same method of comparison and outlier selection described before can be applied to refined first, second, third, fourth, and fifth refined subset images 215a-e in order to further remove motion-corrupted shots and select, for example, fourth refined subset 207d and fourth refined subset image 215d for subsequent rounds of refinement. This can continue for a predetermined number of rounds, until a threshold for motion corruption has been removed, or until a human operator has determined that the image has acquired a predetermined level of quality.

Figure 3:
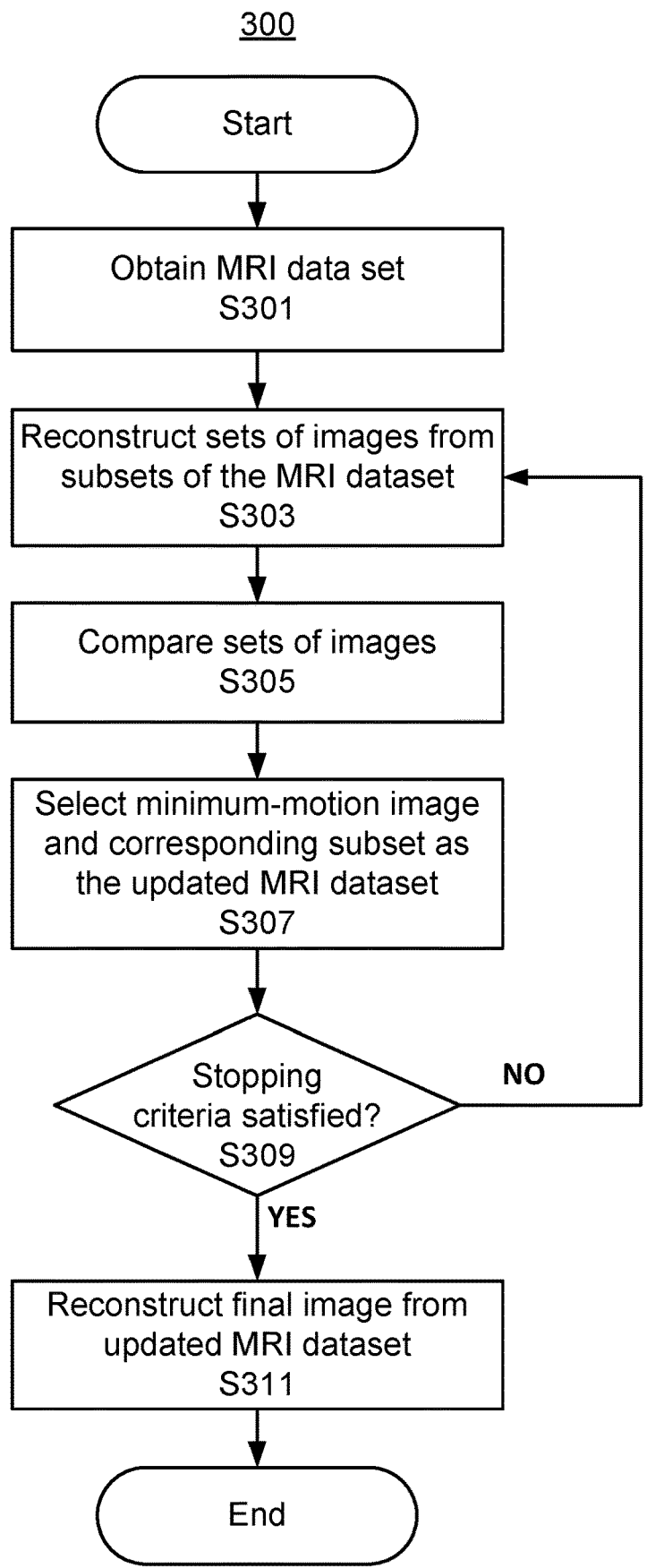
FIG. 3 illustrates a flow diagram of a method for motion artifact detection and correction in image data from an MRI scan, according to an exemplary implementation of the present disclosure.

FIG. 3 shows a flow diagram of a non-limiting example of a method 300 for identifying and correcting motion artifacts in reconstructed images from an MRI scan.

In step S301, MRI scan dataset 205 is obtained by the MRI system 100.

In step S303, the MRI system 100 reconstructs sets of images 210a-210e from the subsets 205a-205e of the dataset 205, wherein at least one shot is removed from the dataset 205 to generate subsets 205a-205e. During the first iteration, the current dataset is the complete dataset 205, but during subsequent iterations the current dataset will be reduced, reflecting that during previous iterations those shots that have been determined to contribute most to a motion artifact have been omitted. For example, according to FIG. 2A, the current dataset for a second iteration would be 205c, and, according to FIG. 2B, the current dataset for a third iteration would be 207d.

In step S305, sets of images 210a-210e are compared to each other to determine which is the outlier image in which the motion artifact is most reduced. For example, this comparison can be performed using an image comparison metric, such as the SSI and PDM image metrics.

In step S307, the subset corresponding to the outlier image is selected as the MRI dataset for the next iteration, or if the stopping criteria is reached, the selected MRI dataset is used to reconstruct the final image in step S311.

In step S309, in inquiry is performed regarding whether the stopping criteria is reached. If the stopping criteria is reached, then method 300 proceeds to step S311. Otherwise method 300 returns to step S303 for another itteration. The stopping criteria can include a maximum number of iterations and one or more convergence criteria.

In step S311, the final (high resolution) image is reconstructed from the subset of the dataset used to reconstruct said outlier image set.

The comparison between sets of images can be measured using myriad techniques known in the art for comparing images (e.g., by determining similarity or dissimilarity between/among images). For example, similarity can be measured by a structural similarity index, a universal quality index, a peak signal-to-noise ratio, a mean squared error, a p-norm-based measure (in which p is non-negative number), a cross-correlation based measure, a perceptual difference model, a Pearson correlation, Tanimoto measure, stochastic sign change, deterministic sign change, minimum ratio, Spearman's ρ, Kendall's τ, greatest deviation, ordinal measure, correlation ratio, energy of joint probability density, material similarity, Shannon mutual information, Rényi mutual information, Tsallis mutual information, and $I_\alpha$ information. Dissimilarity can be measured by, for example, $L_1$ norm, median of absolute differences, square $L_2$ norm, median of square differences, normalized square $L_2$ norm, incremental sign distance, intensity-ratio variance, intensity-mapping-ratio variance, rank distance, joint entropy, and exclusive F-information.

In one implementation, the comparison between sets of images determines similarity by measuring a Euclidian difference distance between the images 210a-210e. Euclidean distance converts images into vectors according to gray levels of each pixel, and then compares intensity differences pixel by pixel. An image with fixed size M×N can be written as a vector $x=\{x_1, x_2, \ldots x_{MN}\}$ according to gray levels of each pixel. The Euclidean distance $d_E(x1, x2)$ between images x1 and x2 is defined as $$d_E(x1,x2) = \sqrt{\Sigma_{k=1}^{MN}(x1_k - x2_k)^2}.$$

In one implementation, the comparison between sets of images determines similarity by measuring a Structural Similarity Index (SSI). Suppose x and y are two nonnegative image signals, which have been aligned with each other (e.g., spatial patches extracted from each image). If one of the signals has higher quality, then the similarity measure can serve as a quantitative measurement of the quality of the second signal. The system separates the task of similarity measurement into three comparisons: luminance, contrast and structure. Together, the measure between two windows x and y of common size N×N can be given as:

$$SSI(x, y) = \frac{(2\mu_x\mu_y + c_1)(2\sigma_{xy} + c_2)}{(\mu_x^2 + \mu_y^2 + c_1)(\sigma_x^2 + \sigma_y^2 + c_2)}$$

where $\mu_x$ is the average of x, $\mu_y$ is the average of $\sigma_x^2$ is the variance of x, $\sigma_y^2$ is the variance of y, $\sigma_{xy}$ is the covariance of x and y, $c_1=(k_1L)^2$ and $c_2=(k_2L)^2$ which can be two variables to stabilize the division with weak denominator, and L is the dynamic range of the pixel-values.

In one implementation, the comparison between sets of images determines similarity by measuring a Perceptual Difference Measurement (PDM). PDM mimics the functional anatomy of the visual pathway and contains components that model the optics and sensitivity of the retina, the spatial contrast sensitivity function, and the channels of spatial frequency found in the visual cortex. PDM can provide a spatial map of the likelihood of perceptible difference and a scalar image quality metric averaged over the spatial map.

In one implementation, comparison of the first image 210a to the second image 210b can be executed using a visual inspection by a human operator. The reconstructed images 210a-210e can be presented to the human operator and the human operator can select at least one image determined to exclude the motion-corrupted shot. The human operator can relay this selection to the MRI system 100 and the reconstruction of the updated image via the second CS method can proceed.

In one implementation, incremental shots are dropped starting with the last chronologically acquired shot. It can be determined that patient/object motion more likely occurred towards the end of the scan, for example at the end of a breath hold, and that shots acquired at the end can be dropped and compared first.

In one implementation, additional shots can be dropped in the vicinity of the first shot determined to include motion. For example, upon determining that the third shot contributes most to the motion artifact, then it can be inferred that the two adjacent shots (i.e., the second and the fourth shots) are the most likely shots to also contribute motion artifacts. This is because the patient's movements are likely to bunch together in time. For example, in FIG. 2A, subset 205c excludes the motion-corrupted shot (herein referred to as the first motion-corrupted shot), one or more shots acquired adjacent to the first motion-corrupted shot can be determined to also contribute to the motion artifact and therefore these additional motion-corrupted shots can be removed prior to generating the updated first, second, third, fourth, and fifth subsets 207a-207e.

For example, a second motion-corrupted shot occurring immediately before the first motion-corrupted shot and a third motion-corrupted shot occurring immediately after the first motion-corrupted shot can be removed. Combinations of shot removal and reconstruction of refined first, second, third, fourth, and fifth refined subset images 215a-215e can be executed until a predetermined level of refinement has been acquired. For example, the first CS method, which is used for the initial image reconstructions (i.e., for images 210a-210e and 215a-215e), can be performed iteratively and stopped once a value of an objective function converges to a value less than a first predefined threshold, and the second CS method, which is used for the final image reconstruction, can be performed iteratively and stopped once the value of the objective function converges to another value less than a second predefined threshold. The second predefined threshold is less than the first predefined threshold. Additionally, a spatial resolution of the plurality of images 210a-210e and 215a-215e can be coarser than a spatial resolution of the final image.

In one implementation, at least one encode from a shot is dropped instead of the entire shot. This can provide additional granularity in acquiring a predetermined level of refinement. For example, removing the entire second motion-corrupted shot can result in a decrease in accuracy of the updated image, so iteratively removing at least one encode from the second motion-corrupted shot and comparing the resulting reconstructed images to each other can determine the number of encodes removable until a decrease in accuracy is detected.

In one implementation, the sampling scheme can include an Auto-Calibrated Signal (ACS). In this case, the encodes inside an ACS line play a significant role in the auto calibration and image reconstruction process. Further, the encodes inside the ACS line correspond to lower spatial frequencies (i.e., they sample points in k-space closer to the origin) than do encodes outside of the ACS line, and, therefore, the encodes within the ACS region are less affected by motion. Accordingly, in certain implementations, for a motion-corrupted shot including encodes both in the ACS region and outside the ACS region, rather than omitting all of the encodes from the motion-corrupted shot, only the encodes outside the ACS region are omitted and the encodes inside the ACS region are preserved. Thus, the ACS can be preserved for auto-calibrated methods like ESPIRiT, which stands for Eigenvector based iTerative Self-consistent Parallel Imaging Reconstruction. Alternatively, encodes and shots representing that sample closer to the origin in k-space can be weighted, such that they are less likely to be omitted as being motion-corrupted, favoring that encodes or shots are dropped outside of the ACS as compared to within the ACS. This implementation is based on the insight that the information sampled in the middle of k-space is the most valuable since it includes large features and low-spatial frequencies, and MRI signal typically are largest near the origin of k-space with wings that fall off continuously farther from the origin. Thus, encodes or shots selected for excluding in reconstruction can be preferentially selected from outside the ACS to prevent deterioration in image quality.

Advantageously, the method of motion artifact detection and correction in the present disclosure does not make any assumptions about the motion and is model-free. The method does not include external triggers, additional navigators or cameras used to determine when the patient moves. Thus, the method described herein does not need additional equipment or hardware—that is to say, all of the MRI data can be collected using a conventional MRI scanner, and the acquisition method is not changed. Thus, the method does not require the additional cost and complications of additional hardware.

Notably, the analysis/comparisons of the reconstructed images 210a-210e and 215a-215e is not performed in k-space. For example, the images can be compared in the image domain. Alternatively, a transformation or image processing filter can be applied to the image before they are compared using the image-comparison metric (e.g., a high/low pass filter or edge-detection filter can be applied to the initial reconstructed images). The reconstructed images, are not compared and the image-comparison metric is not applied in the k-space domain. That is, the reconstructed images 210a-210e and 215a-215e are either compared in the image domain or in an alternative image domain, e.g., in a spatial domain or in a transform domain that is not a spatial-frequency domain, where motion artifacts are easier to detect in the reconstructed images.

As mentioned previously, the reconstruction method used to detect motion corruption does not need to be the same reconstruction method that is used for the final (high resolution) image. The first reconstruction method can be optimized for speed (via selection of regularization, number of iterations, etc.), whereas the second reconstruction method can be optimized for accuracy. The first reconstruction method can be optimized to be more sensitive to motion artifacts. After the selection of the optimal data to be dropped is performed, the updated (high resolution) image reconstruction can use the standard reconstruction method to maintain clinical image quality.

In view of the above discussed features, the method of the present disclosure can detect and omit motion-corrupted parts of an MRI dataset, and thereby recover and purify data that might otherwise be wasted via other methods of motion correction.

While certain implementations have been described, these implementations have been presented by way of example only, and are not intended to limit the teachings of this disclosure. Indeed, the novel methods, apparatuses and systems described herein can be embodied in a variety of other forms; furthermore, various omissions, substitutions and changes in the form of the methods, apparatuses and systems described herein can be made without departing from the spirit of this disclosure.

The invention claimed is:

1. An imaging apparatus, comprising:
processing circuitry configured to
obtain magnetic resonance imaging (MRI) data, the MRI data including encodes that non-uniformly sample k-space,
reconstruct, using a first compressed-sensing (CS) method, a plurality of images from the MRI data, each image of the plurality of images being reconstructed from a subset of the MRI data that excludes a respective one or more encodes of the MRI data, and
select, from the plurality of images, a first image as an image of the plurality of images that optimizes image quality, and select, as updated MRI data, a subset of the MRI data that was used to reconstruct the first image.

2. The apparatus according to claim 1, wherein the processing circuitry is further configured to select the first image by comparing the plurality of images using an image-comparison metric to identify an outlier image as the first image that optimizes the image quality by minimizing a motion artifact.

3. The apparatus according to claim 1, wherein the processing circuitry is further configured to reconstruct, using the first CS method, a final image from the updated MRI data.

4. The apparatus according to claim 1, wherein the processing circuitry is further configured to
reconstruct, using a second CS method, a final image from the subset of the updated MRI data, wherein
the first CS method is faster than the second CS method, and the second CS method reconstructs more accurate and/or higher resolution images than does the first CS method.

5. The apparatus according to claim 1, wherein the processing circuitry is further configured to
reconstruct, using the first CS method, another plurality of images from the updated MRI data, each image of the another plurality of images being reconstructed from a subset of the updated MRI data that excludes a respective one or more encodes of the updated MRI data,
select a second image as an image of the another plurality of images that optimizes the image quality, and select, as the updated MRI data, a subset of the updated MRI data that was used to reconstruct the second image, and
repeat the reconstructing another plurality of images from the updated MRI data and the selecting of the second image and the updated MRI data until one or more stopping criteria are satisfied.

6. The apparatus according to claim 1, wherein the processing circuitry is further configured to reconstruct the another plurality of images, wherein the excluded one or more encodes of the updated MRI data are selected to have been acquired during a time window surrounding a time when the excluded one or more encodes of the outlier image was acquired.

7. The apparatus according to claim 1, wherein the processing circuitry is further configured to select the first image by comparing the plurality of images using the image-comparison metric, wherein the image-comparison metric is one of (i) a structural similarity index, (ii) a universal quality index, (iii) a peak signal-to-noise ratio, (iv) a mean squared error, (v) a p-norm-based measure (in which p is non-negative number), (vi) a cross-correlation based measure, and (vii) a perceptual difference model.

8. The apparatus according to claim 1, wherein the processing circuitry is further configured to use a user input to select the first image by
selecting, based on an image-comparison metric, two or more outlier images from the plurality of images as images that optimize the image quality,
controlling a display to display the two or more outlier images, and
receiving the user input indicating which the displayed two or more outlier images is the first image.

9. The apparatus according to claim 1, wherein the processing circuitry is further configured to
determine a signal indicating whether the MRI data includes one or more corrupt encodes, which correspond to a motion artifact,
reconstruct a final image using all of the MRI data without reconstructing the plurality of images, when the signal indicates that the MRI data does not include one or more corrupt encodes, and
reconstruct the final image by first reconstructing the plurality of images and selecting the updated MRI data in order to then reconstruct the final image from the updated MRI data, when the signal indicates that the MRI data includes one or more corrupt encodes.

10. The apparatus according to claim 1, wherein
the obtained MRI data is acquired using an MRI scan having a pulse sequence of two or more encodes per shot, and
the processing circuitry is further configured to reconstruct the plurality of images, wherein, for each of the plurality of images, the excluded one or more encodes includes all encodes in a shot of the pulse sequence.

11. The apparatus according to claim 1, wherein
the obtained MRI data is acquired using an MRI scan having a pulse sequence of two or more encodes per shot, and
the processing circuitry is further configured to reconstruct the plurality of images, wherein, for each of the plurality of images, the excluded one or more encodes includes all encodes in a shot of the pulse sequence, except encodes in an auto-calibration signal (ACS) region of k-space.

12. The apparatus according to claim 1, wherein the processing circuitry is further configured to select the first image based on the MRI data and results therefrom without reference to direct measurements of motion of a subject being imaged.

13. The apparatus according to claim 2, wherein the processing circuitry is further configured to select the first image based on the image-comparison metric, wherein the image-comparison metric is applied to the plurality of images in a spatial domain or in a transform domain that is not a spatial-frequency domain.

14. The apparatus according to claim 13, wherein the transform domain is transformed into by a wavelet transformation, an edge-detection transformation, a filter transformation, and/or an orthogonal function decomposition.

15. The apparatus according to claim 4, wherein
the first CS method is an iterative CS method that includes repeated iterations that are performed until a value of an objective function becomes less than a first predefined threshold,
the second CS method is an iterative CS method that includes repeated iterations that are performed until the value of the objective function becomes less than a second predefined threshold, which is less than the first predefined threshold, and
a spatial resolution of the plurality of images is coarser than a spatial resolution of the final image.

16. A method of improving image quality in magnetic resonance imaging (MRI) by finding and removing encodes that are corrupted by motion from MRI data, the method comprising:
obtaining MRI data, the MRI data including encodes that non-uniformly sample k-space;
reconstructing, using a first compressed-sensing (CS) method, a plurality of images from the MRI data, each image of the plurality of images being reconstructed from a subset of the MRI data that excludes a respective one or more encodes of the MRI data; and
selecting, from the plurality of images, a first image as an image of the plurality of images that optimizes image quality, and select, as updated MRI data, a subset of the MRI data that was used to reconstruct the first image.

17. The method according to claim 16, further comprising reconstructing, using a second CS method, a final image from the subset of the updated MRI data, wherein
the first CS method is faster than the second CS method, and the second CS method reconstructs more accurate and/or higher resolution images than does the first CS method.

18. The method according to claim 16, wherein the selecting the first image by comparing the plurality of images is performed using an image-comparison metric to identify an outlier image as the first image that optimizes the image quality by minimizing a motion artifact.

19. The method according to claim 18, wherein the image-comparison metric is one of (i) a structural similarity index, (ii) a universal quality index, (iii) a peak signal-to-noise ratio, (iv) a mean squared error, (v) a p-norm-based measure (in which p is non-negative number), (vi) a cross-correlation based measure, and (vii) a perceptual difference model.

20. A non-transitory computer readable storage medium including executable instructions, wherein the instructions, when executed by circuitry, cause the circuitry to perform the method according to claim 15.

* * * * *